Jan. 12, 1937.   M. A. WECKERLY   2,067,743
WEIGHING DEVICE
Filed Feb. 2, 1934   7 Sheets-Sheet 1
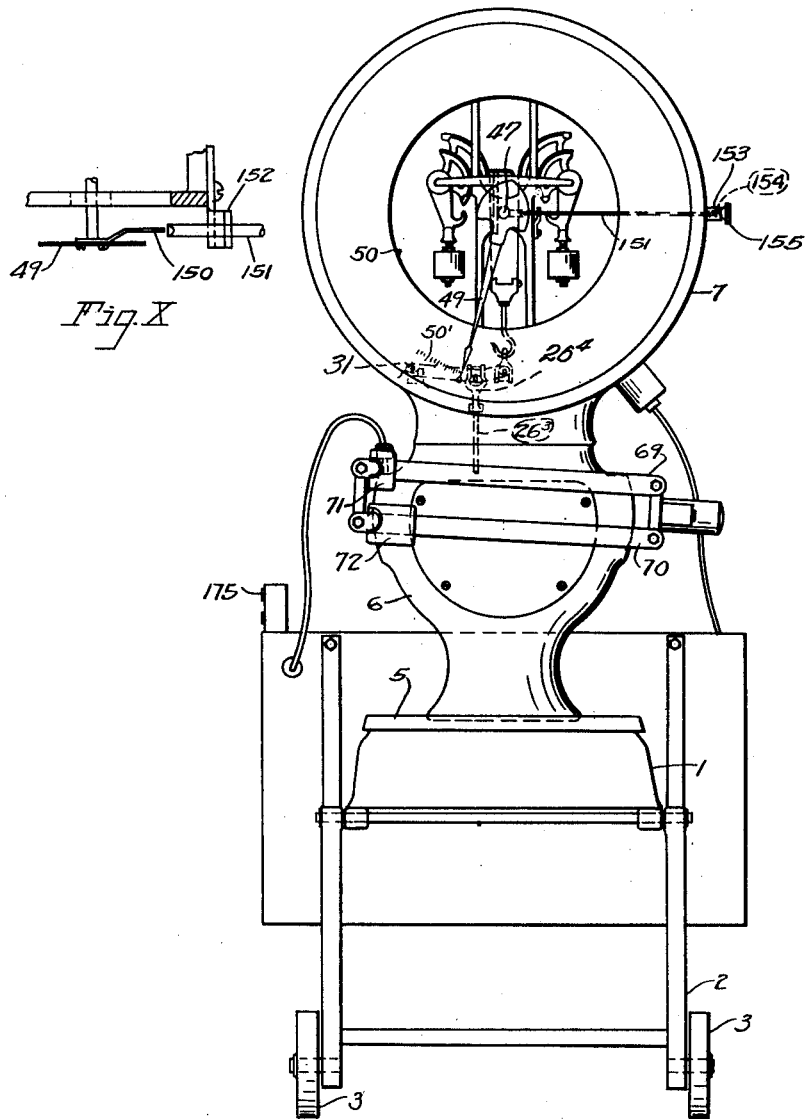
Fig. X
Fig. I
Mark A. Weckerly
INVENTOR
BY C. O. Marshall
ATTORNEY

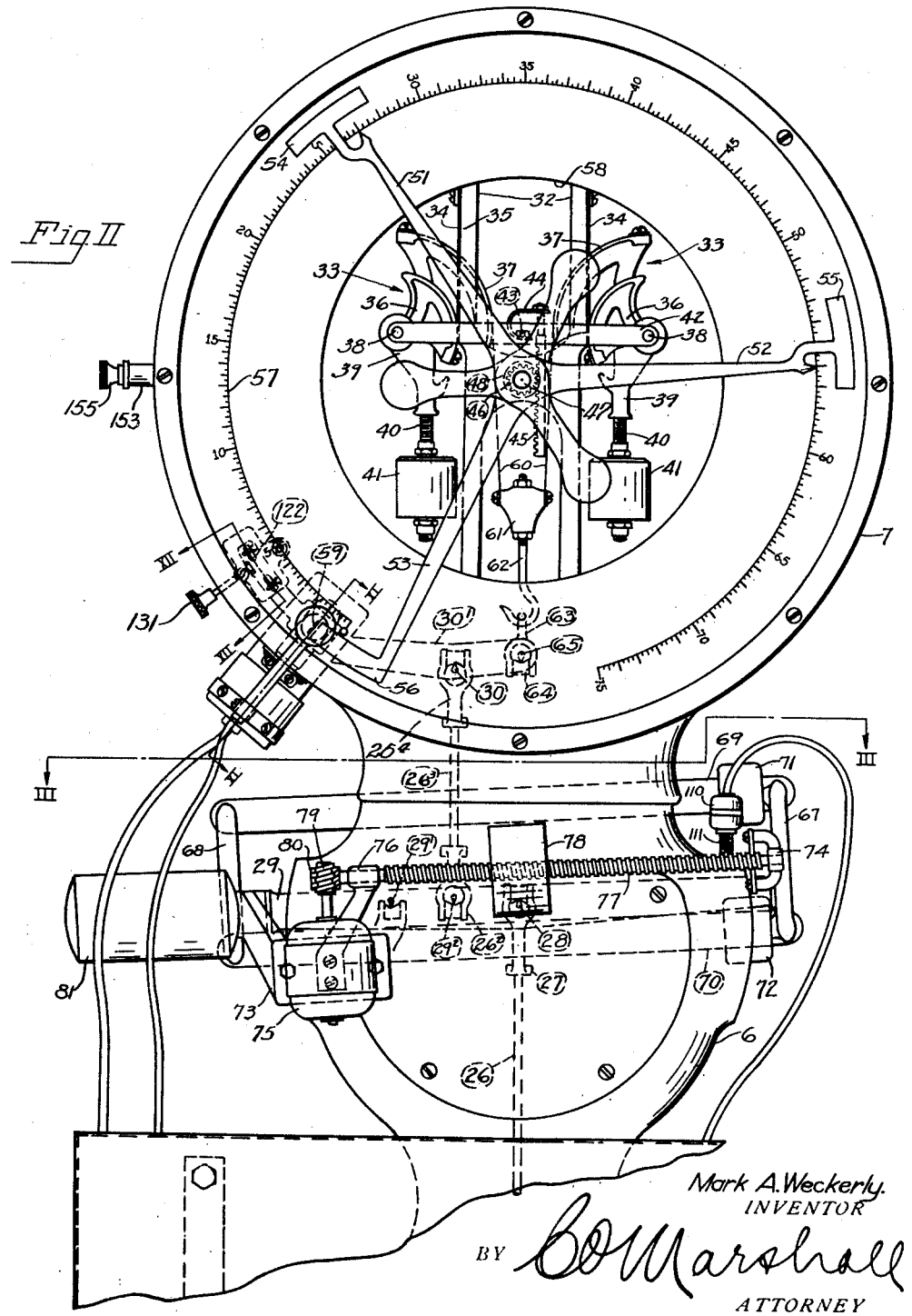

Jan. 12, 1937.　　　M. A. WECKERLY　　　2,067,743
WEIGHING DEVICE
Filed Feb. 2, 1934　　　7 Sheets-Sheet 3
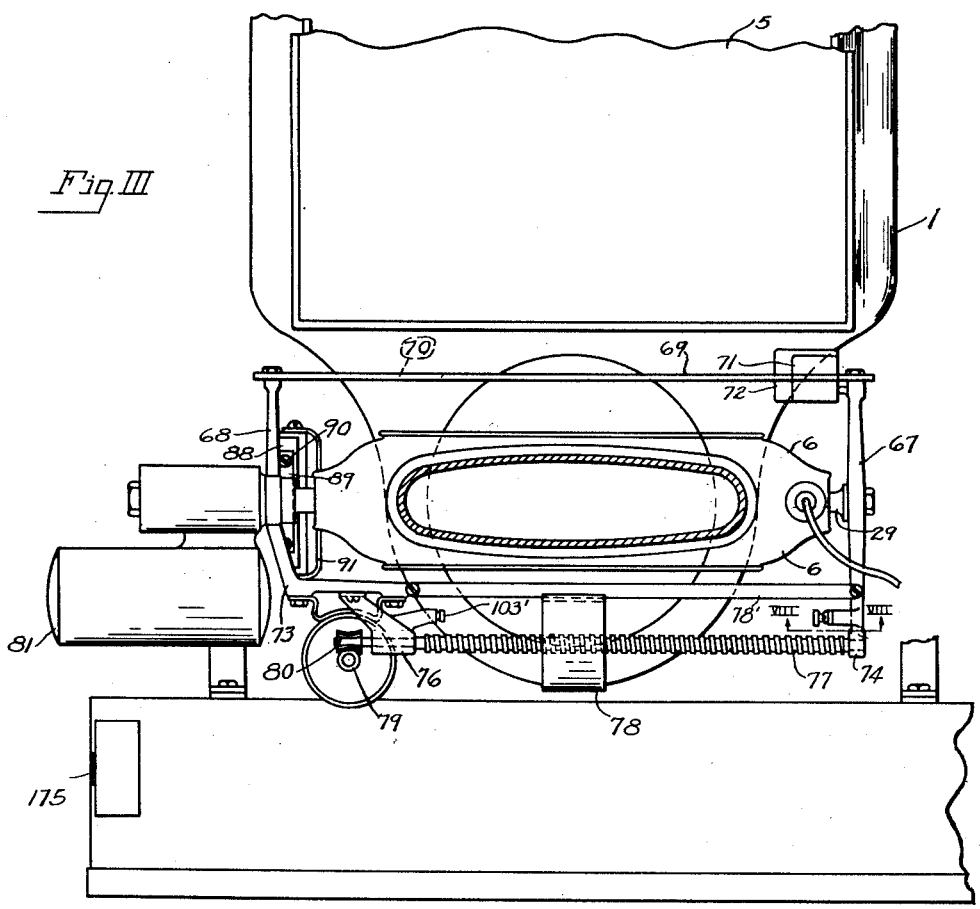
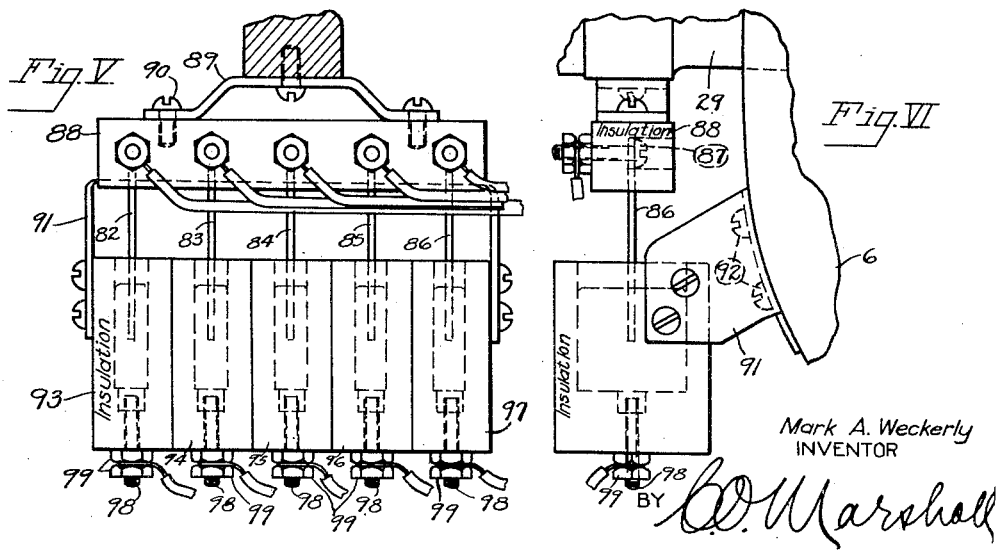
Mark A. Weckerly
INVENTOR
BY C. W. Marshall
ATTORNEY Jan. 12, 1937.  M. A. WECKERLY  2,067,743
WEIGHING DEVICE
Filed Feb. 2, 1934  7 Sheets-Sheet 4
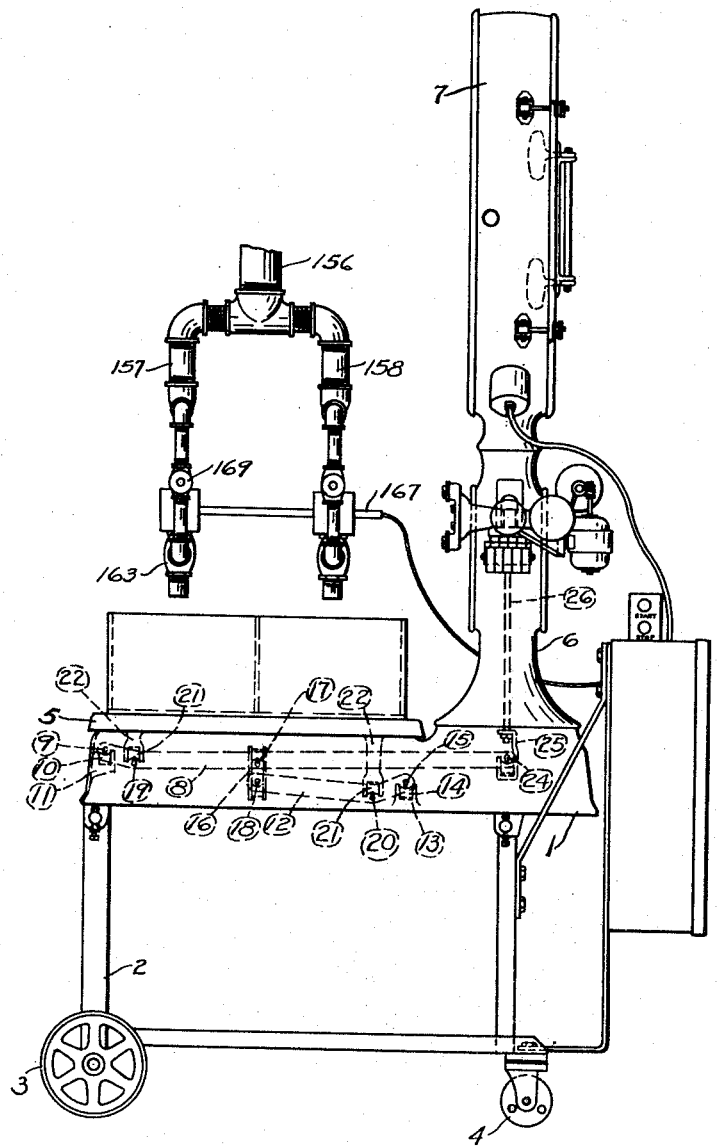
Fig. IV
Mark A. Weckerly
INVENTOR
BY C.O. Marshall
ATTORNEY Jan. 12, 1937.  M. A. WECKERLY  2,067,743
WEIGHING DEVICE
Filed Feb. 2, 1934  7 Sheets-Sheet 5
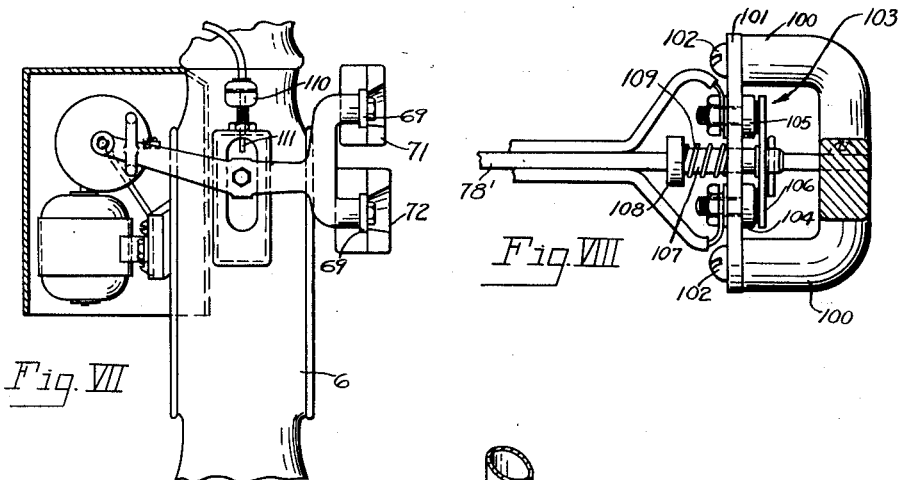
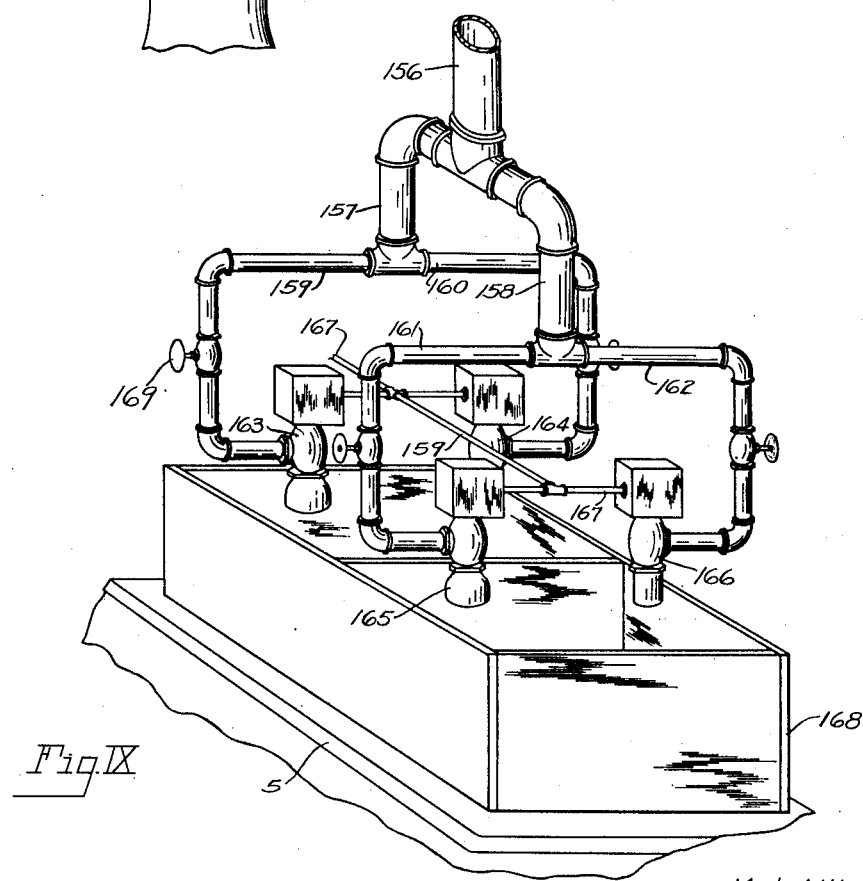
Mark A. Weckerly
INVENTOR
BY CO. Marshall
ATTORNEY Jan. 12, 1937. M. A. WECKERLY 2,067,743
WEIGHING DEVICE
Filed Feb. 2, 1934 7 Sheets-Sheet 6
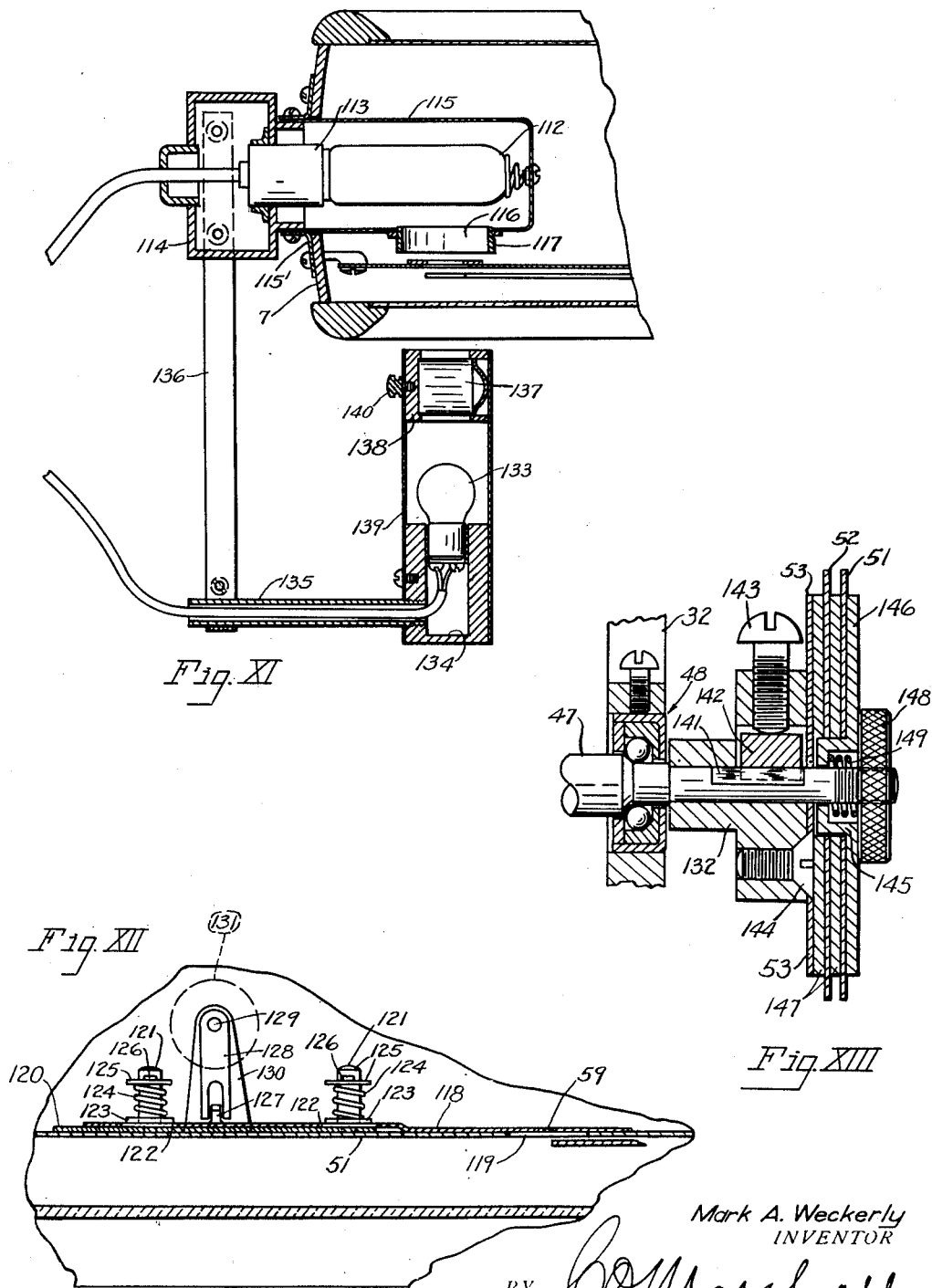
Mark A. Weckerly
INVENTOR
BY C. O. Marshall
ATTORNEY Jan. 12, 1937.    M. A. WECKERLY    2,067,743
WEIGHING DEVICE
Filed Feb. 2, 1934    7 Sheets-Sheet 7
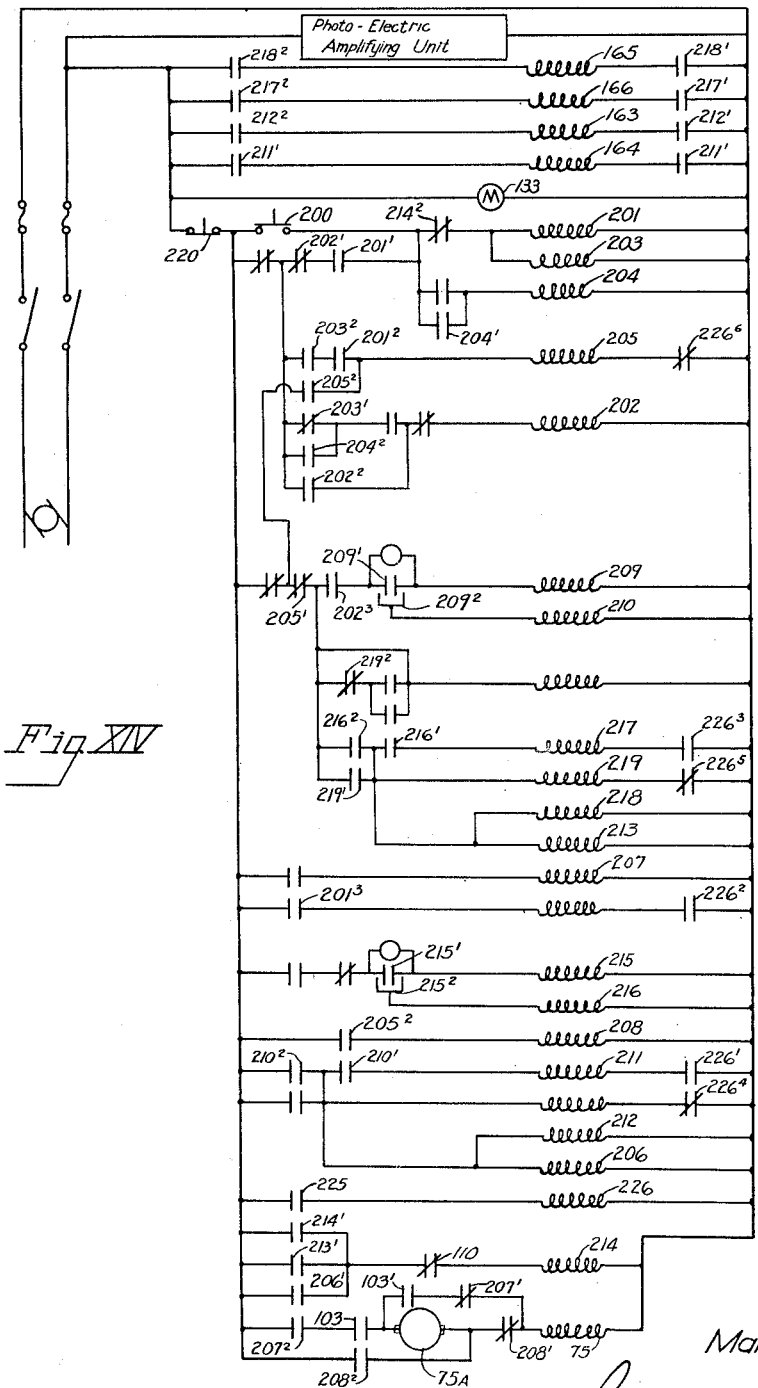
Fig XIV
Mark A. Weckerly
INVENTOR
BY
ATTORNEY Patented Jan. 12, 1937

2,067,743

UNITED STATES PATENT OFFICE 2,067,743

WEIGHING DEVICE

Mark A. Weckerly, Toledo, Ohio, assignor to Toledo Scale Manufacturing Company, Toledo, Ohio, a corporation of New Jersey Application February 2, 1934, Serial No. 709,496

12 Claims. (Cl. 249—61)

This invention relates to improvements in weighing devices and particularly to weighing devices employed in filling containers with a predetermined amount of commodity. Among important objects of this invention is the provision of improved means in an automatic indicating weighing device for automatically offsetting the tare weight of a container when such container is placed on the load receptacle of the device.

Another object is the provision of improved means whereby compensation is made for tare weights at greater speed and accuracy than can be attained with hand operated beams and poises. Ancillary thereto is the obviation of errors due to the human element.

Another object is the provision of means whereby the customary pre-weighing of empty containers is eliminated.

A further object is the provision of means in a device of the kind herein described whereby a multi-compartment container may be filled with equal amount of commodity in each of the compartments.

Another object is the provision of means whereby predetermined amounts of different commodities may be weighed consecutively into a single container.

Still another object is the provision of means whereby the completion of the automatic tare weight offsetting operation automatically initiates the flow of material.

Still another object is the provision of improved means whereby tare weights are offset by the cooperation of a manual load offsetting poise and a poise actuated by an electric motor.

A further object is the provision of improved means for offsetting a predetermined partial amount of tare load by a manually operated load offsetting poise stationed upon a beam and the variable remainder of such tare load by an automatically acting poise.

Still a further object is the provision of improved means for controlling the operation of said automatic tare offsetting means with a photo-electric element.

A further object is the provision of improved means in a device of the class described for automatically controlling the automatic tare offsetting means when the tare weight of a container is greater than the maximum capacity of the tare offsetting means.

Another object is the provision of improved anti-friction means for conveying electric current from a stationary part to an oscillatably mounted member.

Still another object is the provision of improved means for controlling successively automatic tare offsetting means and one or more material feeding means with a photo-electric element.

And an ancillary object is the provision of means in a device of the class described for holding a visual indicator immovable, while adjusting the position of members cooperating with a photo-electric element.

These and other objects and advantages will be apparent from the following description in which reference is had to the accompanying drawings illustrating a preferred embodiment of my invention and wherein similar reference numerals refer to similar parts throughout the several views.

Referring to the drawings in detail:

Figure I is a front elevational view of a weighing scale embodying my invention.

Figure II is an enlarged fragmentary back view of the device shown in Figure I, illustrating in detail the arrangement of the photo-electric control members and the automatically acting poise.

Figure III is an enlarged fragmentary cross-sectional plan view taken substantially along the line III—III of Figure II.

Figure IV is a side elevational view of the complete device showing a container stationed on the load receiver and the relative position of fluid material feeding means.

Figure V is an enlarged end view of an anti-friction means for transmitting electric current from a stationary part to an oscillatably mounted member, such as a lever.

Figure VI is a side elevational view thereof, drawn to the same scale.

Figure VII is an enlarged end view of the lever which supports the manipulative and the automatic tare offsetting means, showing a fragmentary portion of the column.

Figure VIII is an enlarged detailed side view of a circuit breaker attached to the opposite end of the tare offsetting mechanism supporting lever shown in Figure VII seen substantially from the position of the line VIII—VIII of Figure III.

Figure IX is an enlarged perspective view of an improved type of material feed control means which may be used in conjunction with my invention.

Figure X is an enlarged fragmentary cross sectional view of means adapted to hold a visual indicator stationary when the members cooperating with a photo-electric element are being adjusted.

Figure XI is an enlarged cross sectional view substantially along the line XI—XI of Figure II and showing in detail the members comprising the photo-electric control means.

Figure XII is an enlarged fragmentary cross sectional view of means provided for adjusting the position of a light slot forming a part of the photo-electric control means sectioned substantially along the line XII—XII of Figure II.

Figure XIII is an enlarged cross sectional view through hub mechanism attached to an indicator shaft for adjustably holding a plurality of indicators; and Figure XIV is a line diagram of the electrical circuits.

The weighing mechanism illustrated is a preferred type but since the embodiment of my invention may be adapted for use with many types of weighing scales and as the preferred type is fully shown in U. S. Patent No. 1,768,478 to H. O. Hem, it will hereinafter, be described only at such length as is necessary to fully disclose my invention.

Referring to the drawings in detail the weighing scale comprises a base 1 which, for ease of moving it from place to place as may be required, is mounted upon a light but rigid framework 2 provided with wheels and casters 3 and 4 respectively. To an extending portion of the base which projects beyond one edge of a platform or load receiver 5, a column 6 is securely bolted. This column is surmounted by a substantially watch-case-shaped housing 7.

Load supporting lever mechanism is suitably housed within the base 1. This mechanism comprises a main lever 8 fulcrumed by means of a pivot 9 upon a bearing 10 stationed in an integral bracket 11.

An auxiliary, or so called short lever 12 is similarly supported upon a bracket 13 by means of a bearing 14 and a fulcrum pivot 15. A suitable stirrup 16 connects pivots 17 and 18 fixed respectively in the levers 8 and 12.

A load pivot 19 in the main lever and a load pivot 20 in the short lever 12 are engaged by bearings 21 seated in depending feet 22 of a platform spider 5 rests. A pivot 24, with which the long lever is equipped, engages a stirrup 25, suspended by means of a rod 26 and a similar stirrup 27 from a pivot 28 in an auxiliary or tare offsetting lever 29. This lever is fulcrumed by means of a fulcrum pivot 29², fixed therein, upon suitable bearings provided in the interior of the hollow column 6. Stationed intermediately between the pivots 28 and 29¹ is a power pivot 28² engaged by a stirrup 26² forming the lower end of a connection comprising the connecting rod 26³ and stirrup 26⁴ suspended from a load pivot 30 of a motion multiplying lever 30¹. The lever 30¹ is fulcrumed at 31 upon a suitable bearing fixed in a bracket which is an integral portion of the housing 7, while a pivot 65 is fixed in the opposite end of the lever and serves to connect the mechanism thus far described to the load counterbalancing mechanism.

The load counterbalancing mechanism is located within the interior of the housing 7 and comprises generally a support in the shape of a rigid frame 32 from which the two compensating load counterbalancing pendulums 33 are suspended by a plurality of flexible steel ribbons 34. The frame 32 has four accurately ground vertically positioned parallel tracks 35, to the upper ends of which the ribbons 34 are fastened by clips and screws not particularly shown. The lower ends of the ribbons 34 overlie and are fastened to arcuate faces of fulcrum sectors 36 which form the bearings upon which the pendulums 33 rock. Each pendulum is equipped with an eccentrically mounted power sector 37 fastened intermediate the two fulcrum sectors 36 on a shaft 38 upon which a pendulum body 39 is mounted so as to be adjustable with reference to the sectors 36 and 37. For the purpose of obtaining the necessary load resisting moment, a stem 40 with an adjustable weight 41 threaded thereon is studded into each pendulum body.

The ends of the two pendulum shafts 38 are freely engaged by the ends of compensating bars 42 which at their central points are provided with bearings in which a spindle 43 is supported. A resilient shock absorbing member 44 fastened to the spindle 43 supports a rack 45, the teeth of which engage the teeth of a pinion 46 encompassing and pinned to a spindle 47 rotatably mounted in ball bearings 48 stationed in apertures in horizontally extending flanges of the frame 32. That end of the spindle 47 which projects towards the front of the scale (Figure I) supports an indicator 49 which is adapted to cooperate with weight indicia 50¹ marked on a chart 50 which is fastened immediately in front of the counterbalancing pendulums in the housing 7 for the purpose of clearly indicating the weight of a commodity on the platform 5. For a purpose which will hereinafter become clear, the opposite end of the spindle 47 which extends towards the back of the scale has connected thereto a plurality of indicators 51, 52, and 53. Each of these indicators is provided at its outer end with a flag-like projection 54, 55 and 56 respectively, and each is also provided with a pointer which cooperates with a series of weight indicia 57 printed on a chart 58 which in shape and size is identical with the chart 51 on the opposite side of the housing. The indicator 53 is in fixed relation to the indicator 49 on the front of the scale but the indicators 51 and 52 are adjustable to each other and to the indicator 53. A narrow slot 59 is provided near the zero indicium of the series of weight indicia 57 to permit passage of light therethrough.

For the purpose of connecting the pendulum load counterbalancing mechanism to the force transmission system previously described, ribbons 60 overlie the arcuate surfaces of the power sectors 37 to whose upper end they are fastened. Their lower ends engage a yoke-like connecting member 61 into which a hook 62 is threaded. This hook supports a stirrup 63 which by means of a suitable bearing 64 engages a power pivot 65 in the end of the lever 30¹, previously referred to. The ends of the tare offsetting lever 29, which is fulcrumed within the interior of the column 6, extend therethrough, and each end is equipped with a bracket 67 and 68 respectively. Graduated bars 69 and 70 are bolted to outer faces of these brackets on the platform side of the scale and cooperate with tare poises 71 and 72 mounted thereon to constitute the manipulative tare offsetting means hereinbefore referred to. Arms 73 and 74 extend rearwardly from the brackets 68 and 67 respectively and form supports for the members which comprise the automatic tare offsetting means.

The automatic tare offsetting means comprises a universal motor 75 fastened to the face of the arms 73, an arm 76 extending upwardly from this face and supporting a screw 77 rotatably mounted between the arms 76 and 74, a poise 78 upon the screw and an abutting member 78¹ (Figure III) to prevent the poise from rotating when the screw 77 rotates. The rotation of the screw is accomplished by the motor 75 whose armature shaft is provided with a worm 79 the teeth of which mesh with the teeth of worm 80 which encompasses the end of the screw 77. To counterbalance the dead weight of the load receiving mechanism, the lever 29 and the members mounted thereon a loading box 81 is fastened to the bracket 68.

Since electrical current must be transmitted to devices situated on the tare lever, particularly the motor 75, without materially increasing frictional forces, I have provided a series of plungers 82, 83, 84, 85, and 86 anchored by screws 90 to a bracket 89 fastened to the bottom of the end of the lever 29 which projects beyond the column 6. Retained to the column by screws 92 is a clip 91 which supports a series of blocks of di-electric material 93, 94, 95, 96, and 97 each of which is provided with a well filled with metallic mercury into which the plungers 82 to 86 dip. Binding posts 98 studded into the bottom of these blocks communicate with the mercury in the wells and have wires connected thereto by means of the nuts 99.

The arm 74 on the bracket 67 fastened to the opposite end of the tare lever 29 has two inwardly bent bosses 100 to the ends of which an insulating plate 101 is fastened by the screws 102 Figure VIII. This plate forms the base of a switch 103 which comprises contacts 104 and 105 secured to the insulating plate 101 having binding posts projecting on the opposite side of the plate. An armature 106, designed to bridge the gap between the contacts, is attached to a plunger 107 provided with a button like head 108 which is secured to the plunger on the opposite end, and a compression spring 109 which encircles the plunger between the head 108 and the plate 101 serves to keep the armature in engagement with the contacts 104 and 105 until the poise 78 in its travel on the screw 77 engages it and overcomes the pressure of the spring 109, thus breaking the electrical circuit of which the switch 103 forms a part.

Similar mechanism is mounted adjacent the other end of the screw 77 in line with the path of travel of the poise 78 for a similar purpose.

For the purpose of opening a circuit for a reason which will hereinafter be more particularly set forth a somewhat similar electrical switch 110 is fixed on the column 6 (Figures III and VII) so that a plunger 111 situated in the plane of oscillation of the lever 29 is engaged by this lever at a predetermined point of its stroke.

A tubular casing member 115 extends through an aperture into the interior of the housing 7 forming a pocket therein. An annular flanged member 115¹ screwed to the housing 7 surrounds the aperture and serves to firmly retain the tubular casing 115. To a portion of this casing 115, which extends through the wall of the housing 7, is fixed a receptacle 114 in which a socket 113 is mounted for the reception of a photo-electric element 112 in the usual manner.

The position of the photo electric element is so calculated and designed that an opening 116 in the casing 115 is positioned directly back of the previously referred to slot 59. To prevent light from any other source, except that shining through the slot 59, from impinging on the element 112 a flange 117 surrounds the opening 116 and extends into close proximity to the back surface of the chart 5.

For ease in adjustment of the device for accurate operation it is desirable that the position of the slot be adjustable. The slot 59 is cut through a thin member 118 and means are provided which cooperate with this member to position the slot 59 within the confines of an aperture 119 cut through the chart 58. A plate 120 is fastened to the back of the chart into which two studs 121 are riveted. Two slots 122 in the member 118 are of such width and so spaced that the studs freely pass therethrough. Washers 123 surrounding the studs 121 rest over the slots 122 and springs 124 encircling the studs to which they are retained by washers 125 and cotter keys 126 extending through the studs exert a pressure on the member 118 to frictionally retain this member in position. For adjusting the position of the slot a small stud 127 is secured to the member 118 which projects into the bifurcated end of an arm 128 fastened to a shaft 129 which extends through a hole in the housing 7 and an opening in an ear 130 formed by an integrally bent up portion of the plate 120. To that end of the shaft 129 which is on the exterior of the housing 7 a knurled knob 131 is fastened. When it is necessary or desirable to adjust the position of the slot 59 this may be accomplished by turning the knob 131. The furcations of the member 128 actuated by the knob 131, contact the stud 127 on the member 118 and urge it into the desired location, the pressure exerted by the springs 124 being sufficient to retain it in the adjusted position.

A source of light comprising a small incandescent lamp 133 is provided to activate the photo-electric element 112. This lamp 133 is stationed in a socket 134 screwed to the end of a tube 135 which is held by an arm 136 fastened to the receptacle 114, so that light from the lamp 133 shining through a condensing lens 137, which in this case is a section of a solid glass cylinder, is concentrated directly upon the slot 59. The lens 137, for the purpose of accurately focusing the beam of light, is fastened in a holder 138 which may be adjusted back and forth in tube 139 in which the socket 134 is also positioned. When the proper adjustment of the lens 137 has been made it may be locked in this position in the tube by the thumb nut 140.

Cooperating with the photo-electric control element are the indicators 51, 52, and 53 with flag-like projections or interceptors 54, 55, and 56. The indicator 53 is fastened to a hub 132 which is positioned upon the portion of the spindle 47 projecting beyond the ball bearing 48 in the frame 32 on the back of the scale. A portion 141 of this spindle has flat milled faces and the hub 132 is provided with a broached hole in which a block 142 is situated. This block is shaped so as to firmly grip the milled faces when a screw 143 extending through the hub at substantially a right angle to the axis of the spindle, is tightened. The indicator 53 is fastened integrally to the hub 132 by screws 144 fixing its relative position with reference to the indicator 49 on the opposite side of the scale. Indicators 51 and 52 are rotatably positioned on the periphery of a hollow boss 145 forming part of a clamp plate 146 which is also mounted on the spindle 47, discs 147 being provided to space the indicators 51, 52, and 53 from each other. Upon the end of the spindle 47 a nut 148 is threaded pressing a spring 149 against the inside face of the hollow boss 145. This construction provides sufficient pressure to hold the indicators in adjusted position. To hold the indicator 49 immovable when either or both indicators 51 and 52 are adjusted in relation to the indicator 53 and to each other, an arm 150 of sheet metal is riveted to the indicator 49. The end of this arm is provided with a V notch and adapted to be engaged by the chisel pointed end of a plunger 151 which is supported at one end by a bracket 152 fastened to the frame 32, (see Figure X) the other end being supported in a bushing 153 studded into the wall of the housing 7. Within this bushing, in an enlarged portion of the bore, a spring 154 which encompasses the plunger presses outwardly against a knob 155, fixed to the extending tip of the plunger, thus holding the plunger out of engagement with the notched end of the arm 150 unless properly manipulated.

The device herein described is adapted, as hereinbefore stated, to automatically counterbalance the tare weight of commodity receptacles having varying weights and to fill receptacles having a plurality of compartments. It is also adapted to control a plurality of material feeding means. The material handled by these means may be dry fluent material or fluids. Figure IX illustrates the material control means employed in filling containers with lard. These feeding means comprise a delivery spout 156 which terminates in branches 157 and 158. These branches in turn terminate in branches 159, 160, 161, and 162. The branch 159 terminates in a magnetically controlled valve 163, similar valves 164, 165, and 166 from the terminals of the branches 160, 161 and 162 respectively. Conduits 167 are provided to furnish channels for electric wires to the different coils which form part of the magnetic valves. Reference to Figure IX will disclose that two of these valves 163, and 164 are positioned over one compartment and the two valves 165 and 166 are positioned over the other compartment of the container 168 which is shown standing upon the platform 5 or the scale. The flow of one of the valves; for example, 163 of the pair positioned over the first compartment is adjusted by the hand valve 169 in the vertically extending leg of a branch 159 to deliver a much smaller volume of the material per unit of time than the other. A similar adjustment is made in one of the branches positioned over the other compartment.

*Operation*

Let us assume that it is intended to fill multi-compartment containers with lard so that 28 pounds of the material is contained in one of the compartments and also 28 pounds in the other compartment making the total exactly 56 pounds. We also assume that the average weight of the container is five pounds. As a first step the operator presses the knob 155 which causes the plunger 151 secured to the knob to enter the V notch in the arm 150. This holds the indicator 49 in coincidence with the zero indicium on the chart 50 and also holds the indicator 53 on the opposite side of the housing immovable. The operator then with the spindle locked by the means just described, moves the point of the indicator 51 to the 28-pound indicium on the series of indicia 57 on the chart 58. This weight represents the amount of commodity to be filled into one of the compartments of the container 168. Since a similar amount is to be placed in the other compartment the operator, while holding the indicator 51 immovable, moves the indicator 52 so that its pointer coincides with the 56 pound indicium on the same series of indicia. It will be seen that the difference between 28 and 56 is 28 pounds, which equals the amount to be filled in the second compartment. The knob 155 fastened to the plunger 151 is then released so that the spring 154 moves the chisel point out of engagement with the arm 150 on the indicator 49, so that the spindle with the indicators 49, 51, and 53 is free to revolve when a load is placed on the platform 5.

Having determined that the average weight of the containers, to be filled, is substantially five pounds, the operator offsets this average weight by moving one of the poises; for example, No. 71 to a position on the beam 69 where its effective weight moment is sufficient to counterbalance this amount, the weight of the automatic poise 78 being such that from its zero position, on the screw 77 (in which position its weight is counterbalanced) it may move in opposite directions so that its weight moment may add to or subtract from the weight moment of the poise 71. When the container 168 is placed on the platform 5, the flag-like projection 56 on the indicator 53 moves either to a position to intercept the beam of light, emanating from the lamp 133 or to a position where the light is permitted to pass through the slot 59 and impinge on the photo-electric element 112. If light is not intercepted when the container 168 is placed on the platform, it is an indication that the weight of the container is greater than the 5 pounds which were offset by means of the poise 71 on the beam 69 and upon pressing a starter button 175; the motor 75 will rotate in such a direction that it will cause the hand 56 to move in a direction clockwise to a person standing back of the scale until the hand 56 intercepts the beam of light. Interception of the light beam by actuating a system of relays and other electrical devices hereinafter more particularly described, reverses the direction of the motor causing the poise 78 to move towards the right on the screw 77 influencing the mechanism to uncover the slot 59. At this time the system of relays and electrical devices stops the motor 75. If the weight of the empty container placed on a scale platform is less than the predetermined average, however, the flag like projection 56 on the hand 53 intercepts the beam of light and prevents the light from entering the slot 59 the motor runs in the opposite direction and the poise 78 is moved in a direction so that it influences the counterbalancing mechanism in the housing 7 to move the indicator to uncover the slot 59 in the chart. As soon as light re-enters the slot, by means of the system of relays the motor is reversed moving the poise 78 until the flag like projection 56 again intercepts the light. This again reverses the motor 75 and causes the poise 78 to move in the opposite direction, causing the projection 56 to again permit light to enter the photo-electric element. An interlocking mechanism comprising relays and other electrical devices which will hereinafter be more particularly described that stops the motor 75. When the motor 75 is stopped after the weight of the container which may be either heavy or light has been offset, a time delay relay is energized and after the lapse of a desired time interval valves 163 and 164 are opened. The valve 164 allows a larger quantity of material in this example, lard, to pass during a given period of time than the valve 163. The weight of the lard accumulating in the container acting through the levers 8 and 12, and the connecting rod 26³, the lever 30¹, the hook 62 and the ribbons 60 actuates the load counterbalancing pendulums 33, causing them to move outwardly and upwardly and the rack 45 being operatively connected to the compensating bars 42 rotates the spindle with the indicators in an anti-clockwise direction until the edge of the paddle like projection 54 on the indicator 51 covers the slot 59, thus preventing light emanating from the lamp 133 to impinge on the photo-electric element 112. The increased resistance in the darkened element 112 results in de-energization of the coil of the valve 164 closing the valve and stopping the material feeding therethrough. The smaller feed stream, however, continues through the valve 163 until the paddle like projection 54 on the indicator 51 passes over the slot 59 and uncovers the same, allowing light to re-enter the photo-electric element. Suitable relays and other electrical devices then operate to de-energize the coil of the valve 163 stopping the flow of the lard therethrough. The interlocking mechanism, when the coil of the valve 163 is de-energized actuates a further time delay relay and after the predetermined lapse of time energizes the coils of the valves 165 and 166. These now are opened and feed lard into the second compartment of the container. The steps in the operation of valves 165 and 166 are the same as those in the operation of valves 163 and 164 just described until the slot 59 is uncovered by the back edge of the flag like projection 55 of the indicator 52. The desired amount of lard is now in the container. When the operator removes the filled container from the platform, the lever 29 being overbalanced, turns about its fulcrum pivot under the influence of the weight in the loading box until its other end strikes the plunger 111 of the switch 110 which opens a circuit and through relays closes the circuit to the push button station making it possible to start another complete filling operation.

Referring more particularly to the operations of the electrical devices, when the container is placed on the platform the indicator 53 is in a position to either intercept the beam of light or to permit the light to pass through the slot 59 onto the photo-electric element. If the light is not intercepted and the operator depresses the starting button 200 the motor 75 will rotate in a direction to cause the indicator 53 to move clockwise to a person standing back of the scale until the indicator intercepts the beam of light at which time the interlocking mechanism will reverse the direction of rotation of the motor 75. The interlocking mechanism comprises relay 201 with its normally open contacts 201¹, 201², 201³, and relay 202 with its normally closed contact 202¹, its normally open contact 202² which upon operation "makes" before the normally closed contact 202¹ is opened, and its normally open contact 202³, a relay 203 which is a secondary coil parallel to the main coil of the relay 201 and its normally closed contact 203¹ which opens before its normally open contact 203² closes; relay 204 and its contacts 204¹ and 204²; relay 205 with its contacts 205¹, 205², and 205³; relay 206 provided with its normally closed contact 206¹; relay 207 and its contacts 207¹ and 207² which control the energization of the armature of the motor 75 in one direction and the relay 208 and its contacts 208¹ and 208² which control the energization of the armature in the other direction. As soon as the hand 53 under the influence of the weight of a load on the platform uncovers the slot 59 in the dial, the output of the photo-electric amplifying unit will close contact 225 energizing relay 226 closing its normally open contacts 226¹, 226², 226³ and opening its normally closed contacts 226⁴, 226⁵, 226⁶. The motor 75 will be de-energized and stop.

If the weight of the empty container placed on platform is such to permit the hand 53 to come to rest in a position so that the interceptor 56 covers the slot 59 in the chart 58, the motor 75 will be energized to run in a direction to move the poise 78 in such direction that the interceptor 56 moves to a position to uncover the slot 59. Light passing through the slot 59 and impinging upon the photo-electric element 112 causes the motor 75 to be reversed and with the co-operation of the pinions 79, 80 and the screw 77 the poise 78 is moved in the opposite direction. The paddle 56 on the indicator 53 moves to a position which allows light to re-enter the photo-electric element 112. This de-energizes the motor 75. With the de-energization of the motor 75 a time delay relay 209 is energized, its contacts 209¹ and its interlock 209² energizes relay 210 whose function will hereafter be more particularly described. After the lapse of the desired time interval, relays 211 and 212 will cause the contacts 211¹, 211², 212¹, and 212² to close, thus energizing the coils of feed valves 163 and 164 opening the valves. Lard is now discharged through these valves into one compartment of the container 168 standing on the platform 5. (Valve 164 in this example controls the main feed stream and valve 163 the so called dribble stream.) When the relay 212 is energized, a relay 206 is simultaneously energized, its contact 206¹ energizes relay 214 through the circuit of the electrical switch 110. A contact 214² on the relay 214 prevents the initiation of the filling operation when the starter button 200 is depressed until after removal of the filled container. The relay 214 remains energized until the container is removed from the weighing platform 5. Removal of this container causes the contact of the electrical switch 110 to be broken, thus de-energizing the relay 214 and restoring through 214² the starting circuit to its initial operative condition. Relays 211 and 212 remain open until the intercepting paddle 54 on the indicator 51 assumes a position which intercepts the light impinging on the photo-electric element 112. When this occurs the coil of the fast feed valve 164 is de-energized and the valve closes while the slow feed valve 163 continues to permit lard to flow into the container. This flow of material continues until the paddle 54 has passed completely across the slot 59 and light again impinges upon the photo-electric element 112. When this occurs the coil of relay 212 is de-energized and the valve 163 is closed. When the coil of the slow feed valve is de-energized and the valve closed, a time delay relay 215 through its contact 215¹ and its interlock 215² energizes the relay 216 whose function is similar to the function of the relay 210. After the lapse of the desired time interval the coils of slow feed valve 165 and fast feed valve 166 are energized causing the other half of the container to be filled, the operation being similar to the one previously described with the exception that it is done with the cooperation of the indicator 52 through relays 217, 218, 219, and 213 and their contacts, and the function of these parts being similar to the ones previously described in the operation of filling the first compartment.

When a container, whose weight is less than the counterbalancing capacity of the adjusted poises 71 and/or 72, which were set for the average weight of the container, is placed on the platform 5, the poise 78 will travel along the screw 77 until it reaches its safe limit of travel when it will engage the contact plunger 108 and compress the spring 109, thus disengaging the bridging member 106 from the contacts 104 and 105, breaking the circuit which energizes the motor 75 and thereby preventing damage to the mechanism. The operator may then press a stop button 220 which opens all circuits and de-energizes all of the relays therein and depresses the free end of the tare beam lever 29. This operation causes the counterbalancing mechanism comprising the pendulums 33 and all the devices attached thereto and actuated thereby to operate to uncover the light slot 59. Holding the lever in this position the operator may then depress the starter button 200, thus again energizing the motor 75 which, however, in this case will revolve in the opposite direction and return the poise 78 to its initial position. When the poise has reached its initial position pressure on the stop button will again de-energize all the circuits including the motor 75 and leave the device in a condition so that the filling operations may be resumed.

A similar switch in the path of the travel of the poise 78 adjacent the opposite end of the screw 77 performs a similar function when container is heavier than the average weight for which the poises were positioned.

The embodiment of my invention herein shown and described is to be regarded as illustrative only and it is to be understood that the invention is susceptible to variation, modification and change within the spirit and scope of the subjoined claims.

Having described my invention, I claim:

1. In a device of the class described, in combination, automatic load-counterbalancing mechanism, a poise, means connected to said automatic load-counterbalancing mechanism and supporting said poise to act in substitution for said automatic load-counterbalancing mechanism, electric poise-positioning means, means connecting said poise-positioning means to said poise to move said poise into load-counterbalancing position, control means for said electric poise-positioning means, means operated by movement of said automatic load-counterbalancing mechanism away from zero position to actuate said control means to cause said poise-positioning means to move said poise into load-counterbalancing position whereby said automatic load-counterbalancing mcchanism is returned to zero position, and means operated by the return of said automatic load-counterbalancing mechanism to zero position to actuate said control means to stop the operating of said poise-positioning means.

2. In a device of the class described, in combination, automatic load-counterbalancing mechanism, a poise, electric poise-positioning means, means connecting said poise-positioning means to said poise to move said poise into load-counterbalancing position, control means for said electric poise-positioning means, means operated by movement of said automatic load-counterbalancing mechanism to actuate said control means, material feeding means, and means to initiate a flow of material in said material feeding means when said poise is in load-counterbalancing position.

3. In a device of the class described, in combination, automatic load-counterbalancing mechanism, a poise, electric poise-positioning means, means connecting said poise-positioning means to said poise to move said poise into load-counterbalancing position, control means for said electric poise-positioning means, means operated by movement of said automatic load-counterbalancing mechanism to actuate said control means, material feeding means, means to initiate a flow of material in said material feeding means when said poise is in load-counterbalancing position, and means connected with said automatic load-counterbalancing mechanism for causing stoppage of such flow of material.

4. In a device of the class described, in combination, automatic load-counterbalancing mechanism, a poise, electric poise-positioning means, means connecting said poise-positioning means to said poise to move said poise into load-counterbalancing position, control means for said electric poise-positioning means, means operated by movement of said automatic load-counterbalancing mechanism to actuate said control means, material feeding means, means to initiate a flow of material in said material feeding means when said poise is in load-counterbalancing position, and means connected with said automatic load-counterbalancing mechanism for causing diminution of such flow of material and then causing stoppage of such flow of material.

5. In a device of the class described, in combination, automatic load-counterbalancing mechanism, a poise, means connected to said automatic load-counterbalancing mechanism and supporting said poise to act in substitution for said automatic load-counterbalancing mechanism, a reversible electric motor, means connecting said reversible electric motor to said poise to move said poise into load-counterbalancing position, control means for said reversible electric motor, means operated by movement of said automatic load-counterbalancing mechanism away from zero position to actuate said control means to cause said electric motor to move said poise into load-counterbalancing position whereby said automatic load-counterbalancing mechanism is returned to zero position, and means operated by the return of said automatic load-counterbalancing mechanism to zero position to actuate said control means to stop said electric motor.

6. In a device of the class described, in combination, automatic load-counterbalancing mechanism, a poise, means connected to said automatic load-counterbalancing mechanism and supporting said poise to act in substitution for said automatic load-counterbalancing mechanism, a reversible electric motor, means connecting said reversible electric motor to said poise to move said poise into load-counterbalancing position, light-sensitive control means for said reversible electric motor, means operated by movement of said automatic load-counterbalancing mechanism away from zero position to actuate said light-sensitive control means to cause said electric motor to move said poise into load-counterbalancing position whereby said automatic load-counterbalancing mechanism is returned to zero position, and means operated by the return of said automatic load-counterbalancing mechanism to zero position to actuate said light-sensitive control means to stop said electric motor.

7. In a device of the class described, in combination, automatic load-counterbalancing mechanism, a poise, a reversible electric motor, means connecting said reversible electric motor to said poise to move said poise into load-counterbalancing position, light-sensitive control means for said reversible electric motor, means operated by movement of said automatic load-counterbalancing mechanism to actuate said light-sensitive control means, material feeding means, and means to initiate a flow of material in said material feeding means when said poise is in load-counterbalancing position.

8. In a device of the class described, in combination, automatic load-counterbalancing mechanism, a poise, a reversible electric motor, means connecting said reversible electric motor to said poise to move said poise into load-counterbalancing position, light-sensitive control means for said reversible electric motor, means operated by movement of said automatic load-counterbalancing mechanism to actuate said light-sensitive control means, material feeding means, means to initiate a flow of material in said material feeding means when said poise is in load-counterbalancing position, and means connected with said automatic load-counterbalancing mechanism for causing stoppage of such flow of material.

9. In a device of the class described, in combination, automatic load-counterbalancing mechanism, a poise, a reversible electric motor, means connecting said reversible electric motor to said poise to move said poise into load-counterbalancing position, light-sensitive control means for said reversible electric motor, means operated by movement of said automatic load-counterbalancing mechanism to actuate said light-sensitive control means, material feeding means, means to initiate a flow of material in said material feeding means when said poise is in load-counterbalancing position, and means connected with said automatic load-counterbalancing mechanism for causing diminution of such flow of material and then causing stoppage of such flow of material.

10. In a device of the class described, in combination, automatic load-counterbalancing mechanism, a poise, electric poise-positioning means, means connecting said poise-positioning means to said poise to move said poise into load-counterbalancing position, control means for said electric poise-positioning means, means operated by movement of said automatic load-counterbalancing mechanism to actuate said control means, material feeding means, means to initiate a flow of material in said material feeding means when said poise is in load-counterbalancing position, means connected with said automatic load-counterbalancing mechanism for causing stoppage of such flow of material, and means for initiating another flow of material after stoppage of the first initiated flow of material.

11. In a device of the class described, in combination, automatic load-counterbalancing mechanism, a poise, electric poise-positioning means, means connecting said poise-positioning means to said poise to move said poise into load-counterbalancing position, control means for said electric poise-positioning means, means operated by movement of said automatic load-counterbalancing mechanism to actuate said control means, material feeding means, means to initiate a flow of material in said material feeding means when said poise is in load-counterbalancing position, means connected with said automatic load-counterbalancing mechanism for causing stoppage of such flow of material, means for initiating another flow of material after stoppage of the first initiated flow of material, and means connected with said automatic load-counterbalancing mechanism for causing stoppage of such other flow of material.

12. In a device of the class described, in combination, automatic load-counterbalancing mechanism, a poise, electric poise-positioning means, means connecting said poise-positioning means to said poise to move said poise into load-counterbalancing position, control means for said electric poise-positioning means, means operated by movement of said automatic load-counterbalancing mechanism to actuate said control means, material feeding means, means to initiate a flow of material in said material feeding means when said poise is in load-counterbalancing position, means connected with said automatic load-counterbalancing mechanism for causing diminution of such flow of material and then causing stoppage of such flow of material, means for initiating another flow of material after stoppage of the first initiated flow of material, and means connected with said automatic load-counterbalancing mechanism for causing diminution of such other flow of material and then causing stoppage of such other flow of material.

MARK A. WECKERLY.